(12) United States Patent
Miller, Jr. et al.

(10) Patent No.: US 7,762,276 B2
(45) Date of Patent: Jul. 27, 2010

(54) CHECK VALVE

(75) Inventors: John J. Miller, Jr., Sugarcreek, OH (US); Michael Hall, Navarre, OH (US); Charles Brackney, Baltic, OH (US); Andy Keffler, Massillon, OH (US)

(73) Assignee: Superb Industries, Inc., Sugarcreek, OH (US)

( * ) Notice: Subject to any disclaimer, the term of this patent is extended or adjusted under 35 U.S.C. 154(b) by 339 days.

(21) Appl. No.: 11/475,317

(22) Filed: Jun. 27, 2006

(65) Prior Publication Data

US 2006/0289068 A1 Dec. 28, 2006

Related U.S. Application Data

(60) Provisional application No. 60/694,769, filed on Jun. 28, 2005.

(51) Int. Cl.
*F16K 15/02* (2006.01)
(52) U.S. Cl. ............... 137/513.3; 137/540; 137/543.21; 251/366
(58) Field of Classification Search ............ 137/543.21, 137/513.3, 512, 513, 528, 535, 540; 251/366
See application file for complete search history.

(56) References Cited

U.S. PATENT DOCUMENTS

| 2,016,278 | A | * | 10/1935 | Ehlers | 137/493.6 |
|---|---|---|---|---|---|
| 2,504,055 | A | * | 4/1950 | Thomas | 184/105.3 |
| 3,036,594 | A | * | 5/1962 | Salisbury | 137/536 |
| 3,457,949 | A | * | 7/1969 | Coulter | 137/543.21 |
| 3,878,861 | A | * | 4/1975 | Pareja | 137/543.17 |
| 4,373,544 | A | | 2/1983 | Goodman et al. | |
| 4,637,430 | A | * | 1/1987 | Scheffel et al. | 137/516.29 |
| 4,766,930 | A | * | 8/1988 | Patti | 137/540 |
| 5,052,433 | A | * | 10/1991 | Levenez | 137/513.3 |
| 5,092,361 | A | * | 3/1992 | Masuyama et al. | 137/543.21 |
| 5,373,873 | A | * | 12/1994 | Miller et al. | 141/18 |
| 6,216,729 | B1 | | 4/2001 | Hambly et al. | |
| 6,978,800 | B2 | * | 12/2005 | deCler et al. | 137/540 |
| 7,431,048 | B2 | * | 10/2008 | Fangmeier | 137/542 |

* cited by examiner

*Primary Examiner*—Stephen Hepperle
*Assistant Examiner*—Atif H Chaudry
(74) *Attorney, Agent, or Firm*—Fraser Clemens Martin & Miller LLC; J. Douglas Miller

(57) ABSTRACT

A check valve for a fluid handling system is disclosed, the check valve having a main body with a poppet valve disposed therein and a spring urging the poppet valve into abutment with an inner surface of the main body, wherein the check valve facilitates a flow of fluid in one direction and militates against the flow of fluid in an opposite direction.

5 Claims, 7 Drawing Sheets

CHECK VALVE

CROSS-REFERENCE TO RELATED APPLICATION

This application claims the benefit of U.S. Provisional Patent Application Ser. No. 60/694,769 filed on Jun. 28, 2005.

FIELD OF THE INVENTION

The invention relates to a check valve and more particularly to a check valve for a fluid handling system, the check valve having a main body with a poppet valve disposed therein and a spring urging the poppet valve into abutment with an inner surface of the main body.

BACKGROUND OF THE INVENTION

In fluid handling systems such as fluid transfer systems and hydraulic power systems, for example, it is often necessary to control the direction, amount, and type of flow of the fluid through the system. Various pumps, valves, and other fittings are typically used to provide such control.

A check valve is used in a fluid system to control the direction of flow of the fluid in the fluid system. The fluid can be permitted to flow through the valve only in one direction, wherein the check valve militates against flow of the fluid in the opposite direction. Many known check valves are produced from numerous parts resulting in complex devices susceptible to damage, malfunction, and leaks.

It would be desirable to produce a check valve wherein a complexity of the structure of the check valve is minimized and a durability of the check valve is maximized.

SUMMARY OF THE INVENTION

Harmonious with the present invention, a check valve wherein a complexity of the structure of the check valve is minimized and a durability of the check valve is maximized, has surprisingly been discovered.

In one embodiment, a check valve comprises a hollow main body having a first aperture formed at a first end thereof and a second aperture formed at a second end thereof, the main body having a seating surface formed on an inner surface surrounding the first aperture; a poppet valve disposed in the main body, the poppet valve having a seating surface formed on an outer surface thereof adapted to abut the seating surface of the main body; and an urging member disposed between the main body and the poppet valve to urge the poppet valve towards the seating surface of the main body.

In another embodiment, a check valve comprises a hollow metal main body having a first end and a second end, the main body having a seating surface formed on an inner surface at the first end; a metal poppet valve disposed in the main body, the poppet valve having a seating surface formed on an outer surface thereof adapted to abut the seating surface of the main body; and an urging member disposed between the main body and the poppet valve to urge the poppet valve towards the seating surface of the main body.

In another embodiment, a check valve comprises a hollow main body having a first aperture formed at a first end thereof and a second aperture formed at a second end thereof, the main body having a seating surface formed on an inner surface surrounding the first aperture; a poppet valve disposed in the main body, the poppet valve having a seating surface formed on an outer surface thereof adapted to abut the seating surface of the main body and at least one radially outwardly extending tab formed thereon for abutting an inner surface of the main body; and an urging member disposed between the main body and the poppet valve to urge the poppet valve towards the seating surface of the main body.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. It is understood that materials and uses other than those described can be used without departing from the scope and spirit of the invention.

Figure 1:
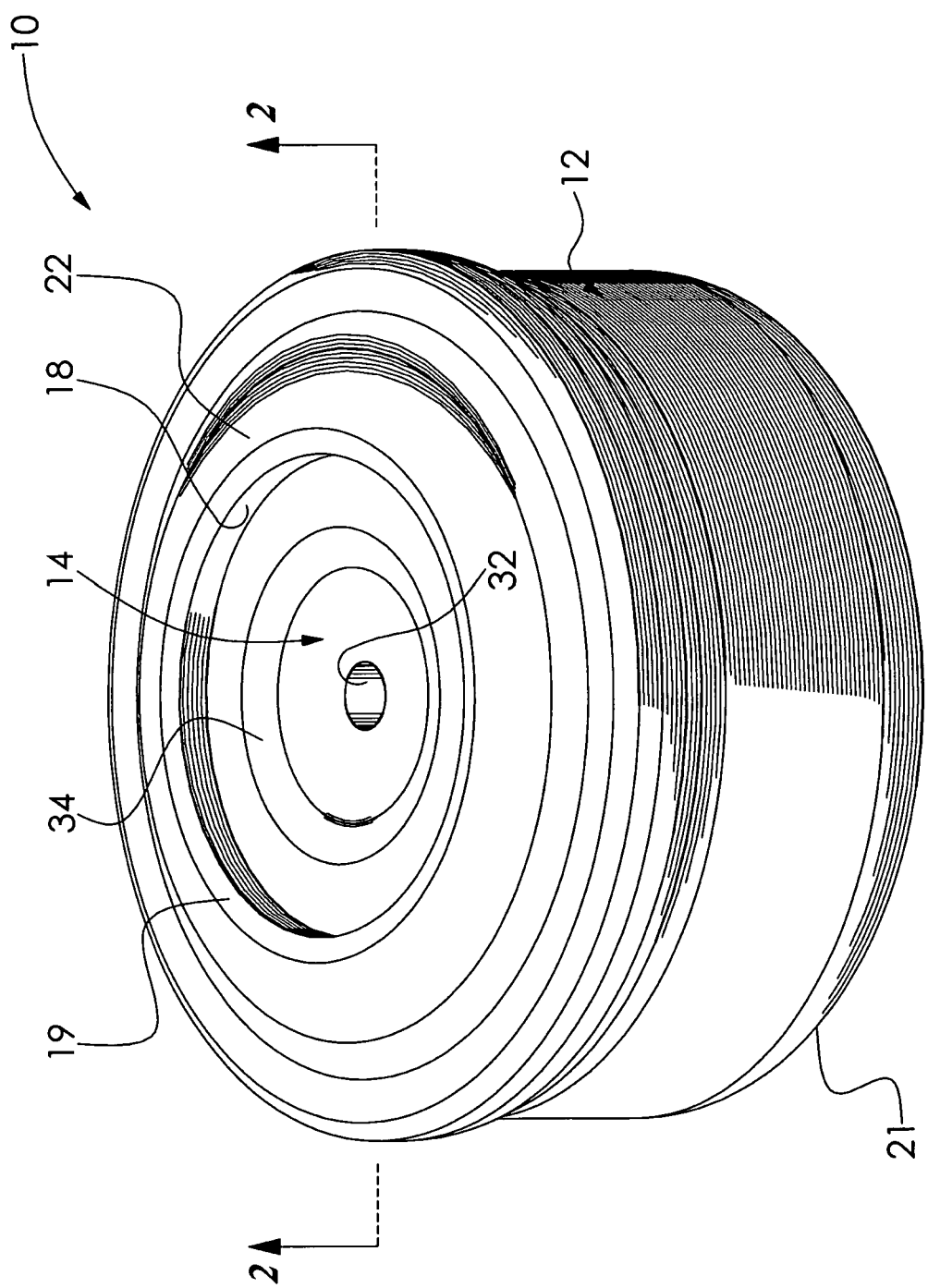
FIG. 1 is a perspective view of a check valve according to an embodiment of the invention.
Figure 6:
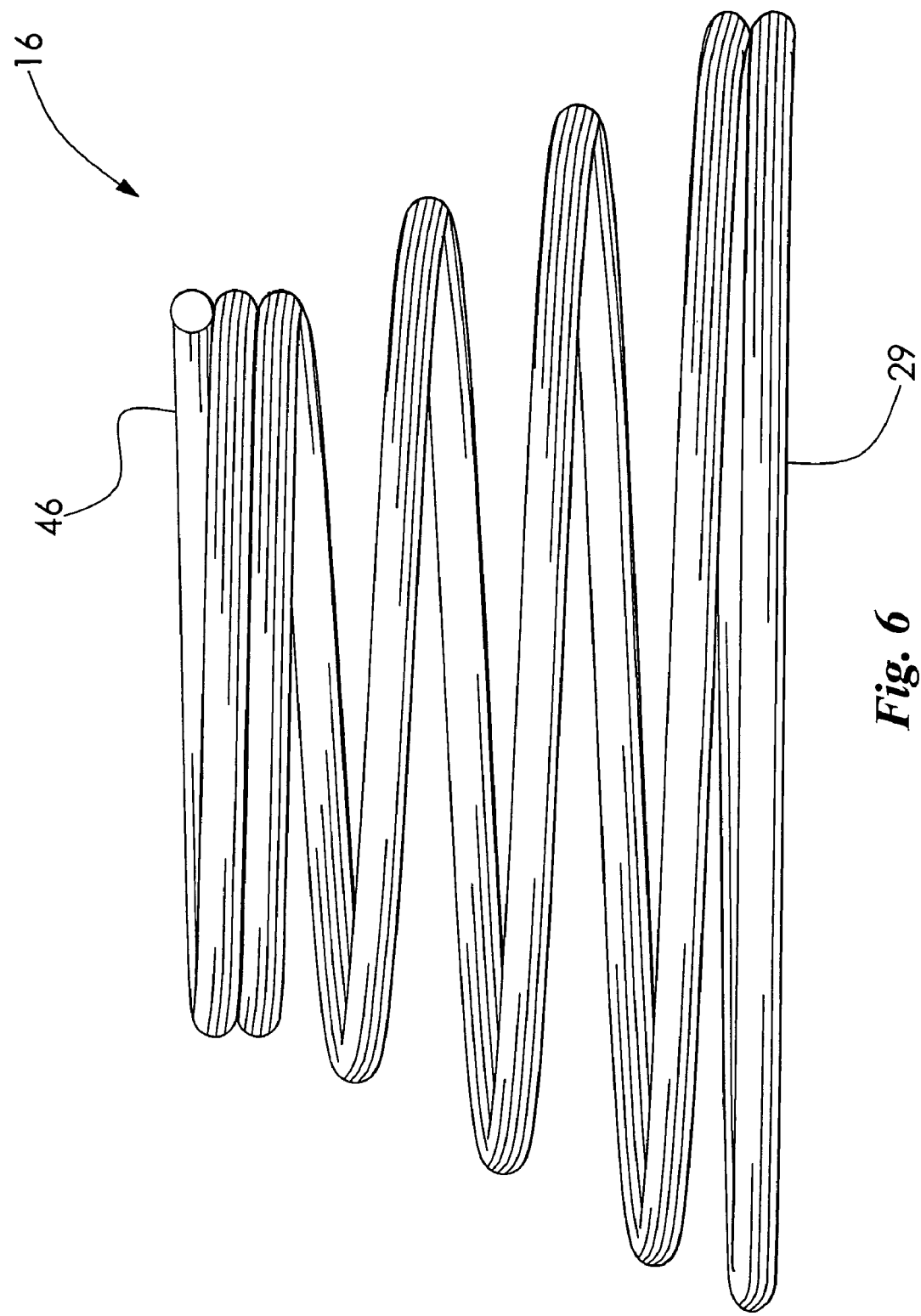
FIG. 6 is a front perspective view of an urging member of the check valve illustrated in FIG. 2.

FIG. 1 illustrates a check valve 10 according to an embodiment of the invention. The check valve 10 includes a hollow main body 12, a poppet valve 14, and an urging member 16 illustrated in FIGS. 2 and 6. The main body 12 has a first aperture 18 formed in a first end 19 thereof and a second aperture 20 formed in a second end 21 thereof, as more clearly shown in FIGS. 2 and 3. A radially inwardly extending first end wall 22 forms the first aperture 18 of the main body 12. A concaved seating surface 24 is formed on an inner surface of the first end wall 22. In the embodiment shown, the first end wall 22 is formed by a process resulting in a thickness T thereof adjacent the seating surface 24 having a greater thickness t of the remaining outer wall of the main body 12. The thickness T results in added strength in the main body 12 adjacent the seating surface 24. A radially inwardly extending second end wall 26 forms the second aperture 20 of the main body 12. An inner surface 28 of the second end wall 26 has a substantially concave shape to form a seat 31 for receiving a first end 29 of the urging member 16. The inner surface 28 militates against an unseating of the urging member 16. In the embodiment shown, the check valve 10 is formed by a stamping process, although it is understood that other manufacturing processes can be used as desired. Additionally, the check valve 10 is produced from metal, although it is understood that other materials can be used to produce the check valve 10.

Figure 2:
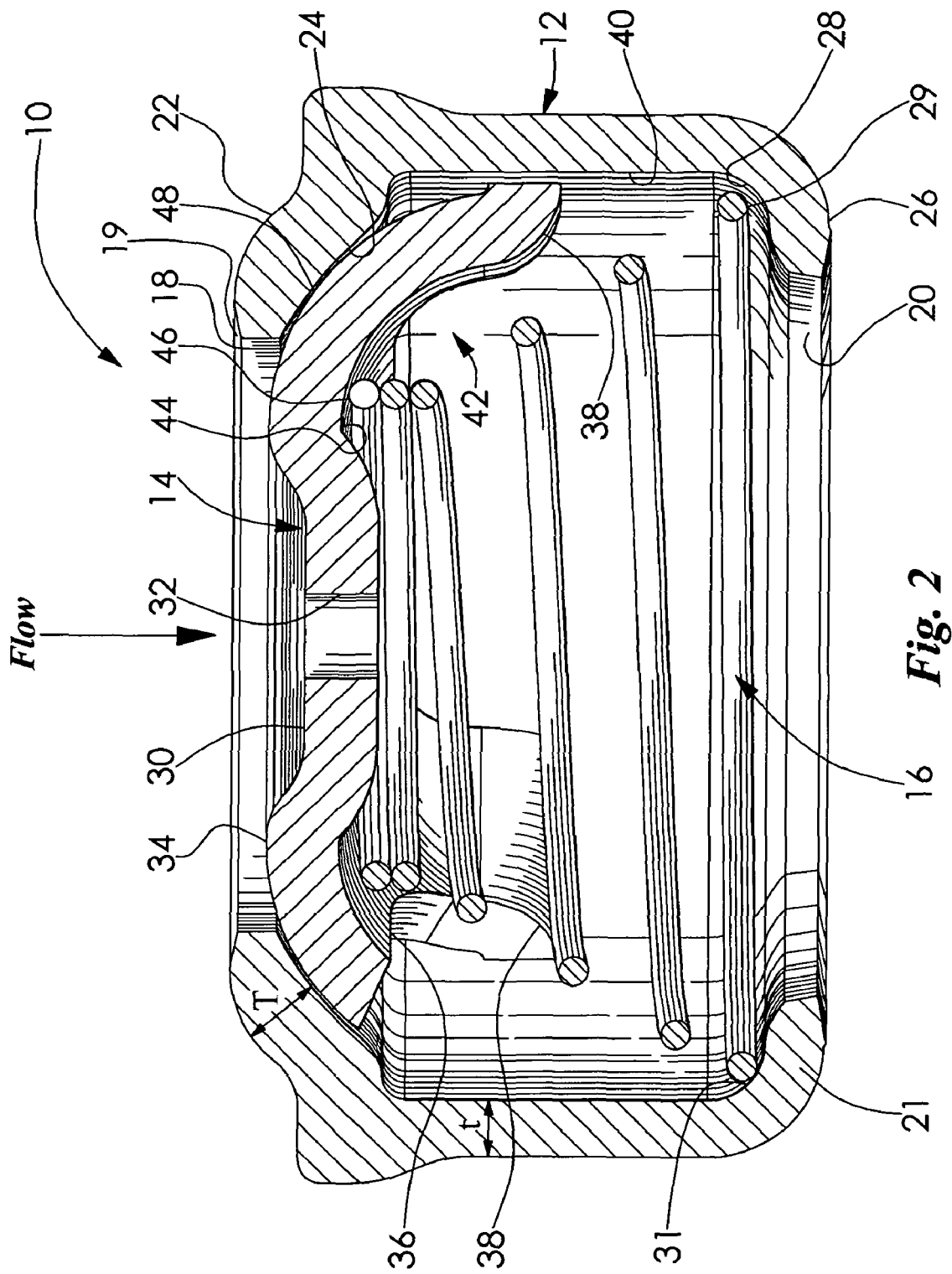
FIG. 2 is a sectional view of the check valve illustrated in FIG. 1 taken along line 2-2.
Figure 3:
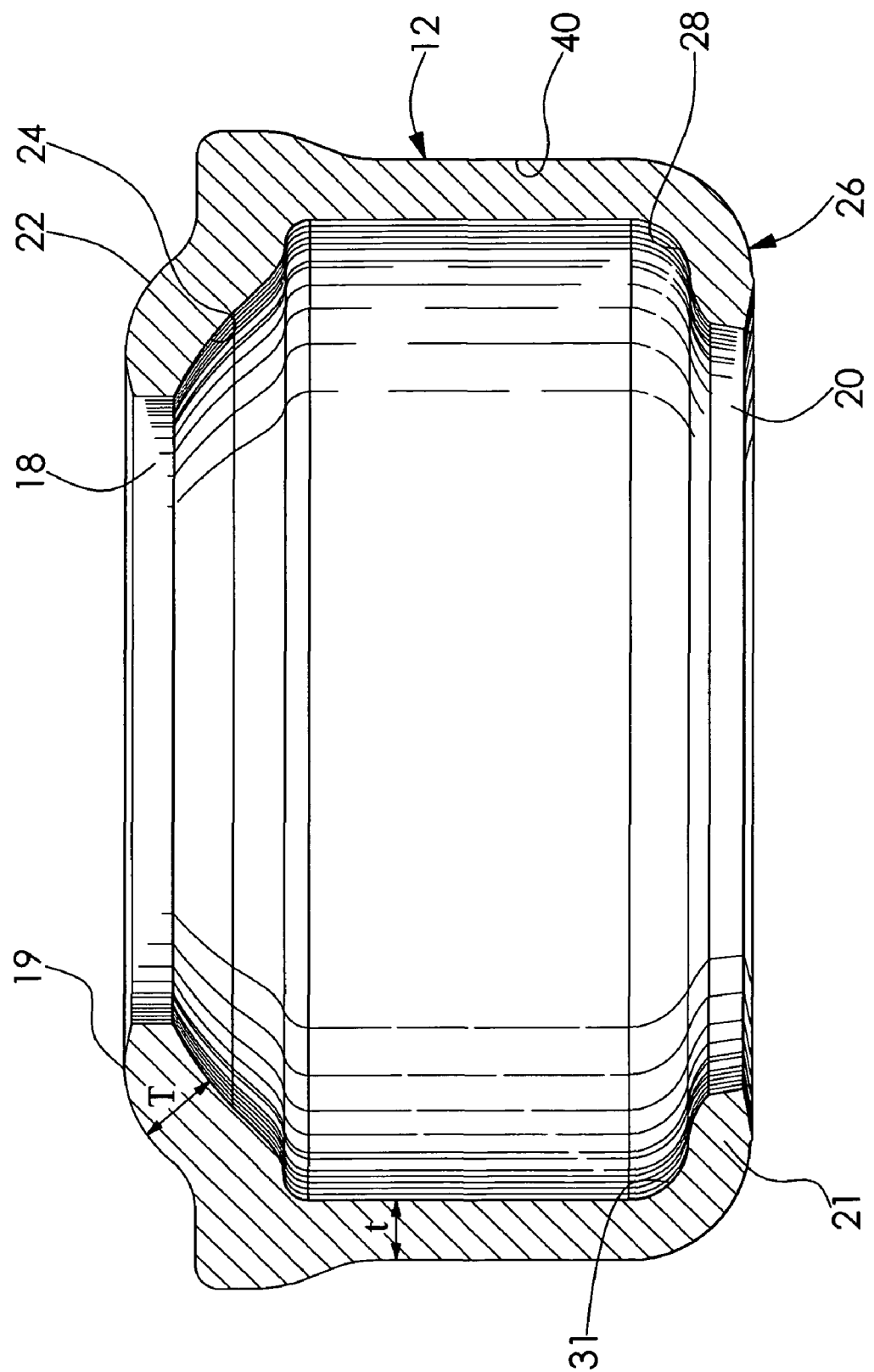
FIG. 3 is a sectional view of a main body of the check valve illustrated in FIG. 2.
Figure 4:
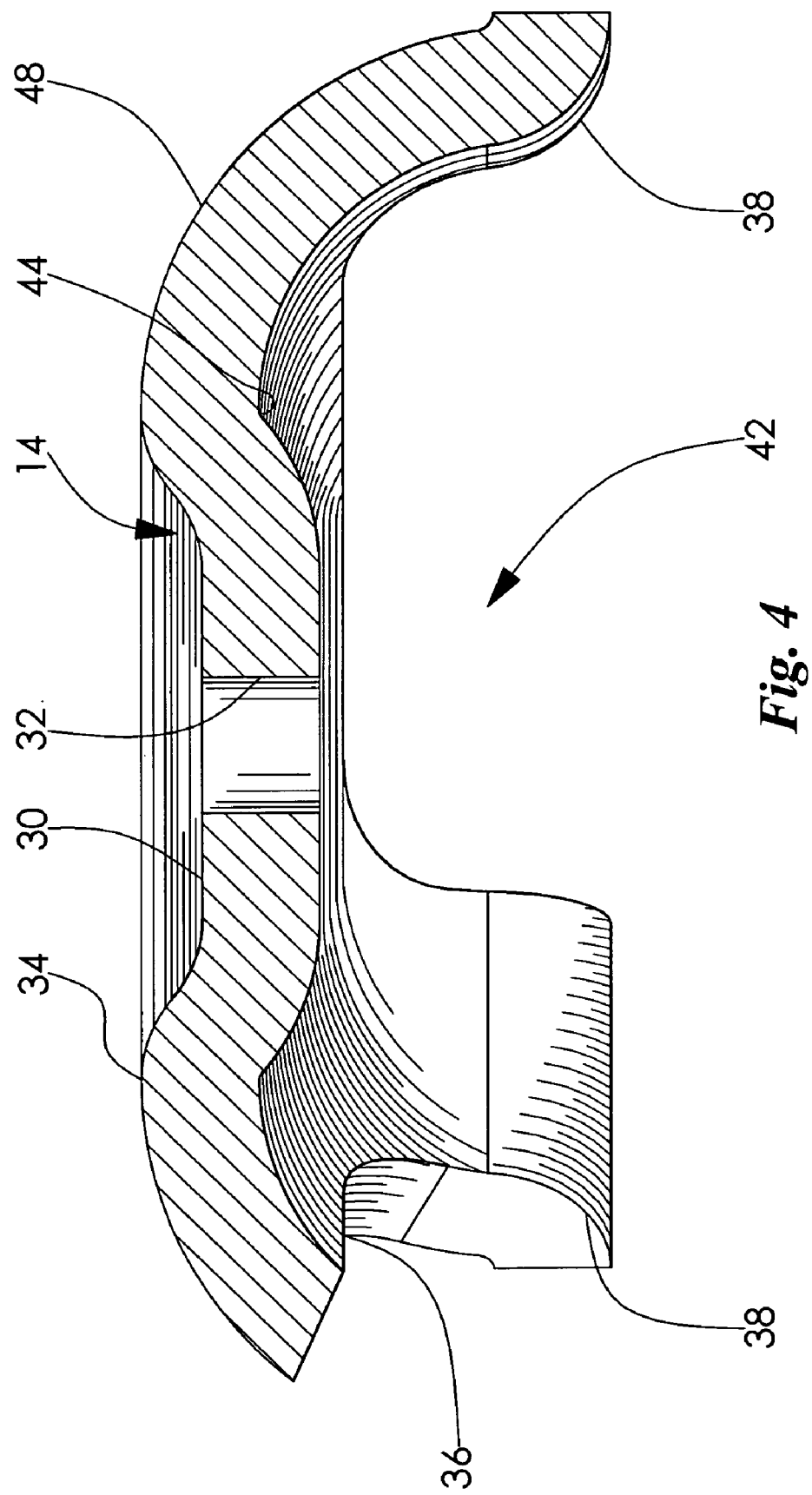
FIG. 4 is a sectional view of a poppet valve of the check valve illustrated in FIG. 2.
Figure 5:
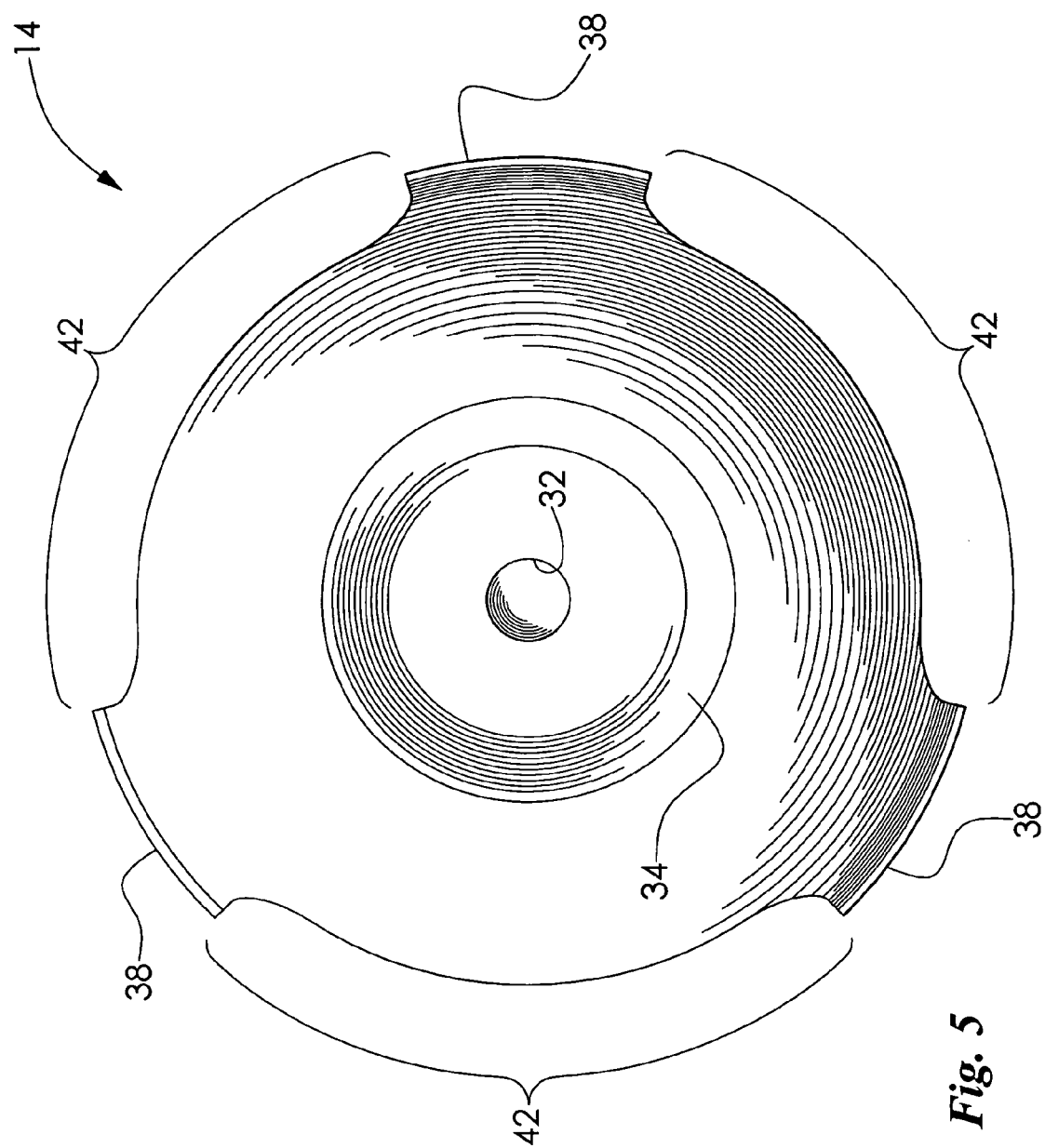
FIG. 5 is a top view of the poppet valve illustrated in FIG. 4.

The poppet valve 14 is substantially dome shaped as clearly shown in FIGS. 2 and 4. A first end 30 of the poppet valve 14 has a central aperture 32 formed therein. An annular ridge 34 surrounds the aperture 32. A second end 36 of the poppet valve 14 includes an annular array of radially outwardly extending tabs 38 most clearly illustrated in FIG. 5. The tabs 38 are adapted to abut an inner surface 40 of the main body 12. A plurality of openings 42 are formed between the tabs 38 of the poppet valve 14. An inner surface 44 adjacent the annular ridge 34 has a substantially concave shape to form a seat for a second end 46 of the urging member 16. A convex seating surface 48 is formed on the poppet valve 14 and is adapted to abut the concave seating surface 24 of the main body 12.

The urging member 16 is disposed between the main body 12 and the poppet valve 14 to urge the convex seating surface 48 of the poppet valve 14 to abut the concave seating surface 24 of the main body 12. The urging member 16 can be any conventional urging member such as a spring, for example. In the embodiment shown, a coil spring is used, although it is understood that other spring types could be used as desired.

In use, the check valve 10 is disposed in a fluid stream such as a conduit (not shown), for example. Normal flow of the fluid stream through the check valve 10 is indicated by the flow arrow shown in FIG. 2. When the fluid is caused to flow into the check valve 10, the poppet valve 14 is caused to move against the force of the urging member 16. This creates a space between the concave seating surface 24 of the main body 12 and the convex seating surface 48 of the poppet valve 14, thereby permitting the flow of fluid therebetween. The fluid continues to flow around the outer surface of the poppet valve 14 and through the openings 42 formed between the tabs 38. As the poppet valve 14 is caused to move in the main body 12, the tabs 38 cooperate with the inner surface 40 of the main body 12 to guide the movement of the poppet valve 14 and militate against a tilting thereof.

When the flow of fluid is stopped, the urging member 16 urges the poppet valve 14 towards the concave seating surface 24 of the main body 12 to cause the convex seating surface 48 of the poppet valve 14 to abut the concave seating surface 24 of the main body 12. The abutment of the seating surfaces 24, 48 creates a substantially fluid tight seal therebetween and militates against a reverse flow of fluid through the check valve 10. If conditions downstream of the check valve 10 cause the fluid to begin to flow in reverse of the arrow shown in FIG. 2, abutment of the seating surfaces 24, 48 is maintained.

Figure 7:
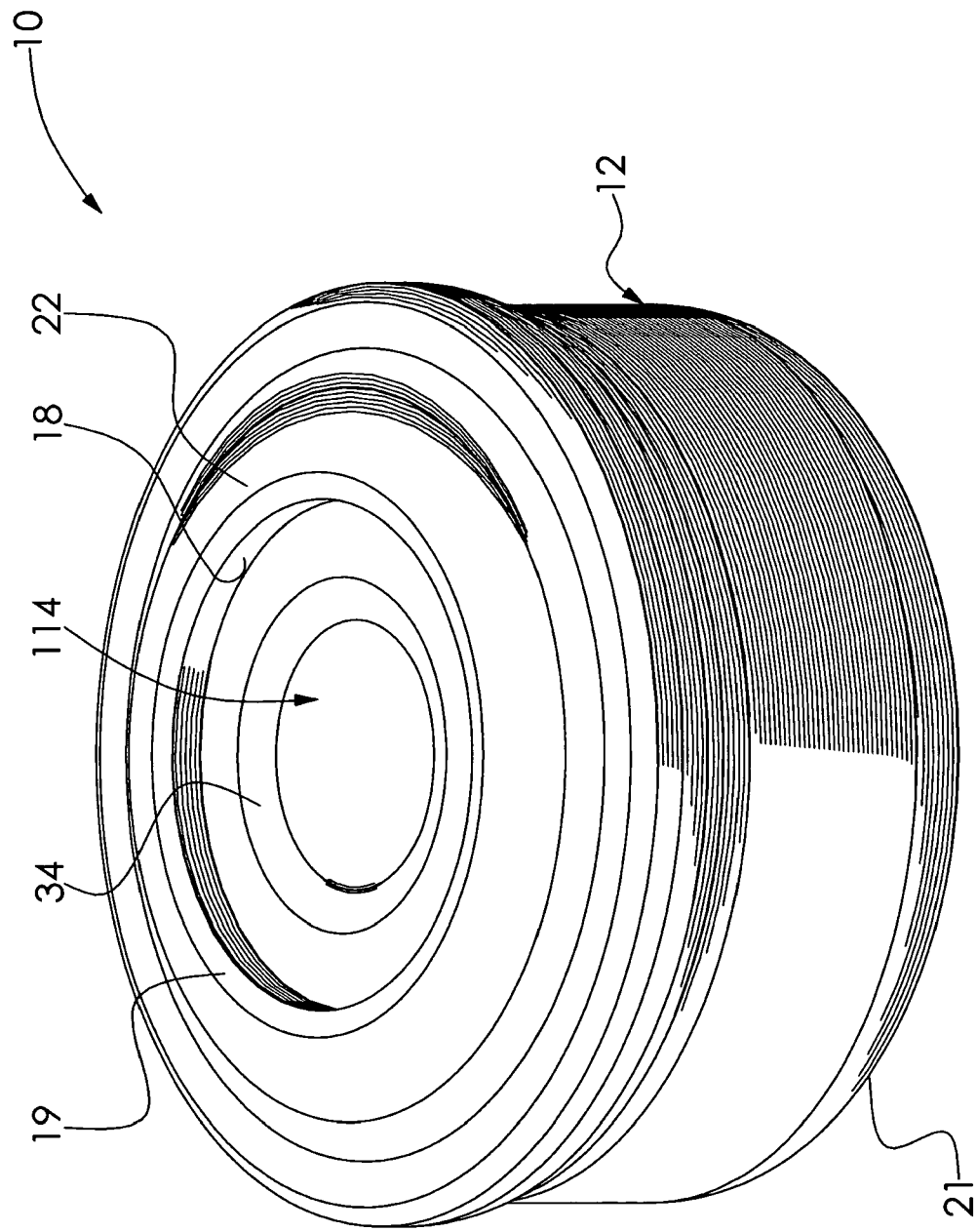
FIG. 7 is a perspective view of a check valve according to another embodiment of the invention.

In the embodiment shown, the aperture 32 is provided in the poppet valve 14 to facilitate a controlled rate of reverse flow through the check valve 10. It is understood that the aperture 32 could be eliminated from the poppet valve 14 if desired to militate against any reverse flow. A poppet valve 114 according to another embodiment of the invention formed without an aperture is shown in FIG. 7.

The check valve 10 of the present invention has been found to be especially useful in a power steering system for a vehicle. However, the check valve 10 can be used in other hydraulic circuits and fluid handling systems as desired without departing from the scope and spirit of the invention.

The check valve 10 of the present invention has surprisingly been found to overcome the limitations of the prior art. The check valve 10 eliminates the requirement for a spring seat and other parts, thus reducing the total number of parts required for the check valve 10. This results in a minimization of the cost and complexity of the check valve 10, minimizes assembly time and the potential for leaks, and maximizes the durability of the check valve 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A check valve comprising:
   a unitary hollow main body having an inner surface, a first end wall at a first end of the unitary hollow main body, the first end wall forming a first aperture and having a curved outer surface and a concave seating surface, and a second end wall at a second end of the unitary hollow main body, the second end wall forming a concave seat and a second aperture, the first end wall separated from the second end wall by a sidewall having an annular outer surface and an annular inner surface, the curved outer surface of the first end wall extending from the first aperture to the annular outer surface, wherein a wall thickness of the first end wall of the main body is defined by an average distance between the curved outer surface and the concave seating surface of the first end wall and is greater than a wall thickness of a rest of the main body;
   a poppet valve disposed in the main body, the poppet valve having an outer surface and an inner surface, the outer surface including a convex seating surface adapted to abut the concave seating surface of the main body, the outer surface including an annular ridge defining a corresponding raised portion on the inner surface of the poppet valve, the inner surface having a concave seat disposed adjacent the raised portion defined by the annular ridge, wherein the poppet valve includes at least one radially outwardly extending tab formed thereon for abutting the inner surface of the main body, the at least one radially outwardly extending tab connected to the poppet valve at a first terminal end of the tab and bending laterally outwardly substantially at a second terminal end of the tab, the terminal end having an end surface substantially parallel with the annular inner surface of the sidewall of the main body; and
   a coil spring disposed in the main body adapted to urge the poppet valve towards the seating surface of the main body, wherein the coil spring has a first end and a second end, the first end abutting the concave seat of the second end wall, and the second end abutting the concave seat of the poppet valve, the first end of the coil spring having a width greater than widths of the second end of the coil spring, the first aperture of the first end wall, and the second aperture of the second end wall, the second end of the coil spring surrounding and cooperating with the raised portion on the inner surface of the poppet valve to align the poppet valve inside the main body.

2. The check valve according to claim 1, wherein the main body and the poppet valve are formed from metal.

3. The check valve according to claim 1, wherein the poppet valve includes an aperture formed therein to facilitate a reverse flow of fluid therethrough.

4. The check valve according to claim 1, wherein the radially outwardly extending tab forms at least one opening to facilitate a flow of fluid therethrough.

5. The check valve according to claim 1, wherein the at least one radially outwardly extending tab first bends downwardly from the poppet valve before bending laterally outwardly substantially at the second terminal end of the tab.

* * * * *